I. W. BOATMAN.
Horse Rake.
No. 68,693.
Patented Sept. 10, 1867.
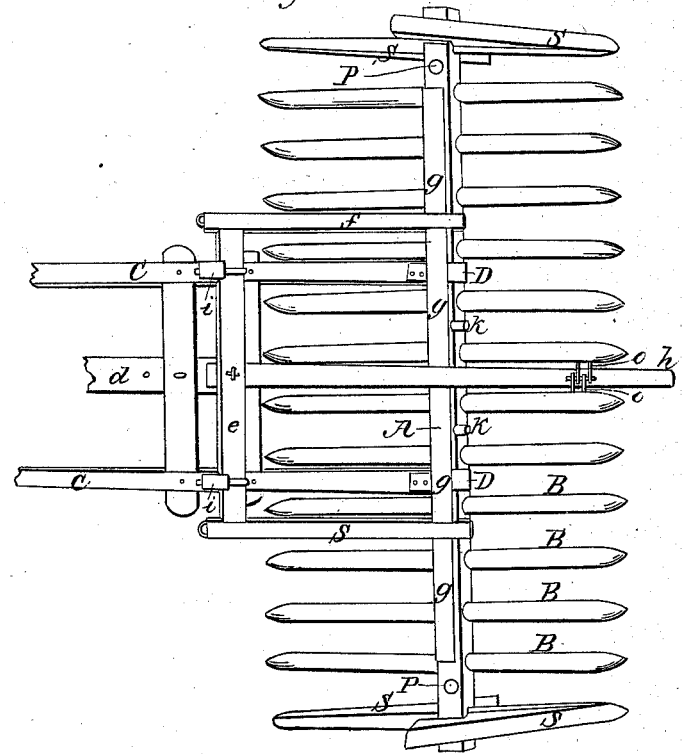
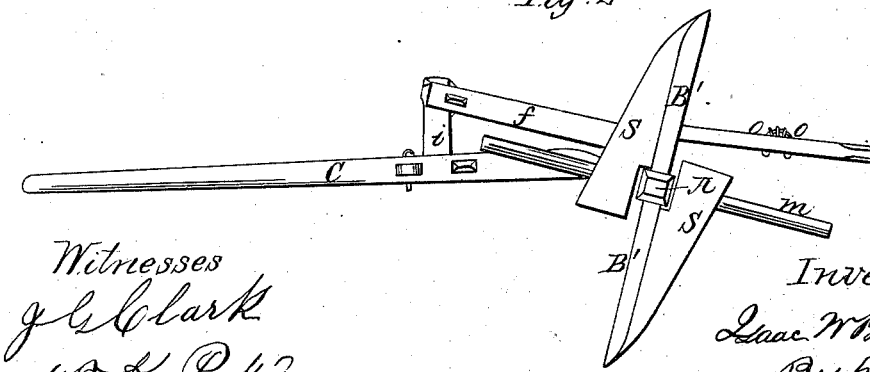

United States Patent Office.

ISAAC W. BOATMAN, OF SEVEN MILE, OHIO.

Letters Patent No. 68,693, dated September 10, 1867.

---

IMPROVEMENT IN HORSE-RAKES.

---

The Schedule referred to in these Letters Patent and making part of the same.

---

TO ALL WHOM IT MAY CONCERN:

Be it known that I, ISAAC W. BOATMAN, of Seven Mile, in Butler county, in the State of Ohio, have invented a new and useful Improvement in Rakes; and I do hereby declare that the following is a full and exact description thereof, reference being had to the accompanying drawings, and to the letters of reference marked thereon.

Figure 1 represents my improved rake in proper position upon the ground for raking hay.

Figure 2 represents an end view of the same, in position for raking stalks.

A indicates the rake-head or shaft, through which the teeth B are inserted in the usual manner. The two end teeth B' are provided with shoes $s\ s\ s\ s$, which support the rake when used for raking hay at a little elevation from the ground, to prevent the teeth from taking up the ground, and thereby causing the hay to be dusty. The shafts or tongue $c\ d$ are connected with the shaft A by the clasps D, loosely, so as to permit the rake to revolve when discharging its load. The frame $e\ f\ g$, to which the handle $h$ is bolted, is connected by hinge-joints to the two upright studs $i\ i$. This frame is capable of movement up and down by means of the handle $h$, and when the rake is employed for raking hay or grain the bar $g$ will rest against the two pins $k\ k$, which project on each side of the shaft A, as seen in fig. 1 of the drawings. But when the rake is used for raking stalks the pins $m\ m$ must be inserted in the holes $p\ p$, through shaft A, so as to occupy a position at right angles to the teeth of the rake. These long pins $m$ serve to assist the rake in its revolutions, and keep it sufficiently elevated to pass freely over the bulk of stalks gathered by the rake. Two links, $o\ o$, are hinged to the upper side of the handle in such a manner as to freely pass between the teeth of the rake as it revolves forward in discharging its load, but which serve as arms to take hold of two of the rake-teeth for the purpose of tilting the rake, to cause it to revolve and discharge its load. When the rake is used for raking stalks the teeth stand in nearly a vertical plane, and the rail $g\ g$ rests against the teeth above the shaft A, to hold the rake in proper position; and, as has been stated, the rail $g$ will rest against the pins $k$ when the rake is used for raking hay, and the shoes $s\ s$ will rest upon the ground. The attendant will cause the rake to make a revolution, or half revolution, to discharge its load, by raising the frame $e\ f\ g$, by means of the handle $h$, and its links $o\ o$ will bear against two of the teeth, between which the handle $h$ extends. The long pins $m$ are removable, and are not required in raking hay; but when stalks are being raked it is necessary that the rake should stand in nearly a vertical position, and when the rake is tilted to pass over the mass of stalks, the ends of the pins $m$ will strike the ground and cause the rake to move over the mass instead of permitting it to fall flat upon its side, which would occasion the teeth to enter the mass of stalks and carry forward a portion in its progress to rake another windrow.

I have found my improved rake to work well in the field, and it can be most readily converted from a hay-rake to be used for raking stalks, by simply inserting the two long pins through the holes in the head or shaft A. It is well known that the hay-rakes in general use cannot be successfully used for raking stalks.

Having fully described my improvement in rakes, what I claim, and desire to secure by Letters Patent, is—

The frame $e\ f\ g$, with its handle $h$, provided with hinged links $o\ o$, in combination with the fixed pins $k\ k$, and removable pins $m\ m$, whereby the rake is made convertible for the purpose of raking stalks or hay, in the manner described.

In testimony hereof I have hereunto set my hand this 11th day of May, 1867.

ISAAC W. BOATMAN.

Witnesses:
    H. P. K. PECK,
    G. FLENNER.